United States Patent
Laaksonen et al.

(10) Patent No.: US 12,266,253 B2
(45) Date of Patent: Apr. 1, 2025

(54) TRACKING TAGS

(71) Applicant: Nokia Technologies Oy, Espoo (FI)

(72) Inventors: Lasse Juhani Laaksonen, Tampere (FI); Arto Juhani Lehtiniemi, Lempaala (FI); Jussi Artturi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 258 days.

(21) Appl. No.: 17/880,837

(22) Filed: Aug. 4, 2022

(65) Prior Publication Data
US 2023/0039245 A1 Feb. 9, 2023

(30) Foreign Application Priority Data

Aug. 9, 2021 (EP) ..................... 21190263

(51) Int. Cl.
*G08B 21/02* (2006.01)
*G08B 7/06* (2006.01)
*H04W 4/02* (2018.01)
*H04W 4/021* (2018.01)
*H04W 4/029* (2018.01)

(52) U.S. Cl.
CPC .......... *G08B 21/0266* (2013.01); *G08B 7/06* (2013.01); *G08B 21/0275* (2013.01); *G08B 21/0277* (2013.01); *H04W 4/021* (2013.01); *H04W 4/023* (2013.01); *H04W 4/029* (2018.02)

(58) Field of Classification Search
CPC .. G08B 21/0266; G08B 7/06; G08B 21/0275; G08B 21/0277; H04W 4/029; H04W 4/021; H04W 4/023
See application file for complete search history.

(56) References Cited

U.S. PATENT DOCUMENTS

| | | | |
|---|---|---|---|
| 2014/0203916 A1* | 7/2014 | Sano ................. | G06K 7/10089 340/10.6 |
| 2015/0161424 A1* | 6/2015 | Nevid ................ | G06Q 30/0259 340/10.1 |
| 2017/0215034 A1* | 7/2017 | Blowers ............. | H04W 4/06 |
| 2019/0156643 A1* | 5/2019 | Quilter .............. | G08B 21/0227 |
| 2020/0242912 A1* | 7/2020 | Cho ................... | G08B 21/24 |

* cited by examiner

*Primary Examiner* — Thomas D Alunkal
(74) *Attorney, Agent, or Firm* — McCarter & English, LLP (57) ABSTRACT

An apparatus, method and computer program is described including: detecting a tracking tag in proximity of a user device (the tracking tag not being pre-associated with the user device); responsive to the detection (and while the tracking tag remains in proximity of the user device): identifying one or more contextual parameters associated with the tracking tag; and responsive to determining that the identified one or more contextual parameters meet a predetermined criterion or criteria, issuing or causing issuance of an alert to the user device and/or to the tracking tag.

14 Claims, 8 Drawing Sheets

TRACKING TAGS

FIELD

Example embodiments relate to an apparatus, method and computer program product relating to tracking tags. Example embodiments may relate to issuing alerts relating to tracking tags, such as for alerting a user about the presence of a tracking tag that is proximate their user device but not pre-associated with their user device.

BACKGROUND

Tracking tags are devices that can be used to indicate the current and/or past location of the tracking tag to one or more users via a user device. A common use is to attach a tracking tag to a valuable item, such as a set of keys or a wallet, in order for a user to locate said item or items via a user device if they cannot find said valuable item. The user device may run an application which can, via radio communication of the user device with the tracking tag or with a platform associated with the tracking tag, estimate the location of the tracking tag and therefore enable the user to locate said item or items such as by indicating the current location on a map and/or a directional indicator of where the tag is relative to the user device.

Determining the location of a tracking tag can be performed in a number of known ways.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus, comprising means for: detecting a tracking tag in proximity of a user device, the tracking tag not being pre-associated with the user device; responsive to the detection, and while the tracking tag remains in proximity of the user device: identifying one or more contextual parameters associated with the tracking tag; and responsive to determining that the identified one or more contextual parameters meet a predetermined criterion or criteria, issuing or causing issuance of an alert to the user device and/or to the tracking tag.

The means for detecting the tracking tag may be further configured to detect that the tracking tag is not in proximity of another user device with which it is pre-associated.

The detecting means may be configured to detect the tracking tag by means of a short-range wireless communication link.

The means for identifying the one or more contextual parameters may be configured to estimate a geolocation of the tracking tag over a period of time and the means for issuing or causing issuance of the alert may be based on the estimated geolocation meeting the predetermined criterion or criteria. Further, the means for issuing or causing issuance of the alert may be responsive to the estimated geolocation being one or more of a predetermined geographic location, within a predetermined geographic area and crossing a predetermined geo-fence. The predetermined geographic location, geographic area and geo-fence may correspond with a user's home and/or workplace.

The means for issuance or causing issuance of the alert may be responsive to a predetermined type or level of change in the identified one or more contextual parameters. Furthermore, the means for identifying the one or more contextual parameters may be configured to estimate a transportation mode associated with the tracking tag over a period of time and wherein the means for issuing or causing issuance of the alert is responsive to a change in transportation mode from a first transportation mode to a second transportation mode. The first transportation mode may be associated with a greater number of travellers than the second transportation mode. The first transportation mode may be associated with a public transportation mode and the second transportation mode is associated with a private or lone transportation mode. In some example embodiments, the means for identifying the one or more contextual parameters is configured to estimate the transportation mode by one or more of: measuring an estimated geolocation of the user device or the tracking tag; measuring one or more estimated movement characteristics of the user device or the tracking tag; use of an application on the user device associated with a carrier associated with a particular form of transportation mode; and a payment or booking made using the user device for travel with a carrier associated with a particular form of transportation mode.

The means for issuing or causing issuance of the alert may be responsive to the tracking tag being in proximity of the user device for greater than a predetermined period of time.

The means for identifying the one or more contextual parameters may be configured to identify a number of other user devices or tracking tags in proximity of the user device and the means for issuing or causing issuance of the alert is responsive to the identified number being below a predetermined value.

The means for issuing or causing issuance of the alert is configured to output a user alert and, responsive to receiving a user selection associated with the user alert, to cause the tracking tag to sound an audio alert, to vibrate and/or to indicate on the user interface an estimated direction of the tracking tag. The user alert may be a visual alert, for example to output by a user interface of the user device. Alternatives include haptic or audio alerts (e.g. via smart earbuds or other devices). The user alert could be output by a user interface of the connected device (e.g. a television, earbuds, smartwatch, smart glasses, other wearable or an Internet of Things (IoT) device).

According to a second aspect, this specification describes a method, comprising: detecting a tracking tag in proximity of a user device, the tracking tag not being pre-associated with the user device; responsive to the detection, and while the tracking tag remains in proximity of the user device: identifying one or more contextual parameters associated with the tracking tag; and responsive to determining that the identified one or more contextual parameters meet a predetermined criterion or criteria, issuing or causing issuance of an alert to the user device and/or to the tracking tag.

Detecting the tracking tag may be include detecting that the tracking tag is not in proximity of another user device with which it is pre-associated.

Identifying the one or more contextual parameters may include estimating a geolocation of the tracking tag over a period of time and issuing or causing issuance of the alert may be based on the estimated geolocation meeting the predetermined criterion or criteria. Further, issuing or causing issuance of the alert may be responsive to the estimated geolocation being one or more of a predetermined geographic location, within a predetermined geographic area and crossing a predetermined geo-fence. The predetermined geographic location, geographic area and geo-fence may correspond with a user's home and/or workplace.

Causing issuance of the alert may be responsive to a predetermined type or level of change in the identified one or more contextual parameters. Furthermore, identifying the one or more contextual parameters may include estimating a transportation mode associated with the tracking tag over a period of time and issuing or causing issuance of the alert may be responsive to a change in transportation mode from a first transportation mode to a second transportation mode. In some example embodiments, identifying the one or more contextual parameters may include estimating the transportation mode by one or more of: measuring an estimated geolocation of the user device or the tracking tag; measuring one or more estimated movement characteristics of the user device or the tracking tag; use of an application on the user device associated with a carrier associated with a particular form of transportation mode; and a payment or booking made using the user device for travel with a carrier associated with a particular form of transportation mode.

Issuing or causing issuance of the alert may be responsive to the tracking tag being in proximity of the user device for greater than a predetermined period of time.

Identifying the one or more contextual parameters may include identifying a number of other user devices or tracking tags in proximity of the user device and the means for issuing or causing issuance of the alert is responsive to the identified number being below a predetermined value.

Issuing or causing issuance of the alert may include outputting a user alert and, responsive to receiving a user selection associated with the user alert, causing the tracking tag to sound an audio alert, to vibrate and/or to indicate on the user interface an estimated direction of the tracking tag.

According to a third aspect, this specification describes a computer program comprising instructions for causing an apparatus to perform at least the following: detecting a tracking tag in proximity of a user device, the tracking tag not being pre-associated with the user device; responsive to the detection, and while the tracking tag remains in proximity of the user device: identifying one or more contextual parameters associated with the tracking tag; and responsive to determining that the identified one or more contextual parameters meet a predetermined criterion or criteria, issuing or causing issuance of an alert to the user device and/or to the tracking tag. Example embodiments may also provide any feature of the first or second aspects.

According to a fourth aspect, this specification describes a computer-readable medium (such as a non-transitory computer-readable medium) comprising program instructions stored thereon for performing at least the following: detecting a tracking tag in proximity of a user device, the tracking tag not being pre-associated with the user device; responsive to the detection, and while the tracking tag remains in proximity of the user device: identifying one or more contextual parameters associated with the tracking tag; and responsive to determining that the identified one or more contextual parameters meet a predetermined criterion or criteria, issuing or causing issuance of an alert to the user device and/or to the tracking tag. Example embodiments may also provide any feature of the first or second aspects.

According to a fifth aspect, this specification describes an apparatus comprising: at least one processor; and at least one memory including computer program code which, when executed by the at least one processor, causes the apparatus to: detect a tracking tag in proximity of a user device, the tracking tag not being pre-associated with the user device; responsive to the detection, and while the tracking tag remains in proximity of the user device: identify one or more contextual parameters associated with the tracking tag; and responsive to determining that the identified one or more contextual parameters meet a predetermined criterion or criteria, issue or cause issuance of an alert to the user device and/or to the tracking tag. Example embodiments may also provide any feature of the first or second aspects.

BRIEF DESCRIPTION OF DRAWINGS

Example embodiments will now be described, by way of non-limiting example, with reference to the accompanying drawings, in which.

DETAILED DESCRIPTION

Example embodiments relate to an apparatus, method and computer program product for issuing, or causing issuance of, alerts relating to one or more tracking tags. Example embodiments may, for example, alert a user about the presence of a tracking tag that may be proximate to their user device but is not pre-associated with their user device. Put another way, the tracking tag may be "foreign" to their user device and may in fact be pre-associated with another user device or another user.

In some cases, a foreign tracking tag may also be "unaccompanied," meaning that the owner of the tracking tag is not proximate their own tracking tag. In this case, it may be that the owner has placed their tracking tag on or in an item belonging to the other user in order to secretly track that other user's location.

A tracking tag in this context may be any device capable of being located by one or more user devices via radio signals transmitted by the tracking tag.

A tracking tag may be a portable, self-contained device which may comprise one or more antennas for receiving and transmitting signals wirelessly with one or more proximate devices, such as user devices, and one or more control modules for performing control functions. A tracking tag may be powered by one or more batteries, but could be a passive device such as a radio frequency identifier (RFID) tag. One or more memories may also be provided on the tracking tag, for example for storing an identifier of the tracking tag which may be a serial number or code which enables a user device and/or a tracking platform to uniquely identify the particular tracking tag as distinct from other tracking tags.

Tracking tags may have a range of form factors and sizes. A tracking tag may, for example, resemble a relatively small keyring or fob.

A user device may determine that a tracking tag is proximate using one or more short-range communication techniques. For example, a tracking tag may periodically transmit a beacon using a short-range communication technique in order for user devices to discover the presence of the tracking tag and possibly its identifier. Alternatively, or additionally, user devices may transmit a discovery signal that may cause proximate tracking tags to send a response signal to indicate their presence and possibly their identifier to the requesting user device.

Short-range communication techniques between the tracking tag and one or more user devices may be by means of any suitable protocol, such as one or more of the Bluetooth, Bluetooth Low Energy (BLE), ZigBee, WiFi or Ultra-Wideband (UWB) technologies or some other short-range wireless communication link.

A tracking tag may be capable of determining its own location and reporting that location to one or more user devices via the one or more antennas.

For example, a tracking tag may comprise a Global Navigation Satellite System (GNSS) receiver, or similar, for determining a geolocation of the tracking tag using positioning reference signals from a plurality of orbiting satellites. Alternatively, or additionally, a tracking tag may comprise a receiver for receiving other forms of positioning reference signals from, for example, radio access network (RAN) base stations, e.g. eNBs or gNBs, or other fixed-location access points, such as WiFi access points, such that the tracking tag can determine its location using known multilateration techniques. The determined location can be reported to, for example, one or more user devices pre-associated with the tracking tag either directly, or indirectly, via one or more other user devices and/or a tracking platform with which the tracking tag is pre-associated.

Alternatively, or additionally, a tracking tag's location may be based on the location of one or more nearby objects, such as one or more user devices in short-range communication with the tracking tag. For example, a user device in short-range communication with the tracking tag may determine its own location using one or more of the above location techniques, e.g. GNSS or other forms of multilateration, and the tracking tag's position may be assumed to be approximately the same as that of the user device. Where a plurality of user devices are in short-range communication with the tracking tag, each able to determine their own location using one or more of the above location techniques, multilateration may be used to more accurately determine the location of the tracking tag, which may be based on an estimate of the respective distance between each user device and the tracking tag.

A user device may comprise, but is not limited to, a smartphone, digital assistant, digital music player, personal computer, laptop, tablet computer or a wearable device such as a smartwatch. A user device may also comprise one or more antennas for receiving and transmitting signals wirelessly with one or more proximate devices, such as one or more tracking tags via short-range communications protocols, and also radio access network (RAN) base stations, e.g. eNBs or gNBs, and other fixed-location access points, such as WiFi access points.

A tracking tag may be pre-associated with a user or a predetermined group of users. Such users or group of users may be permitted, via a tracking application (which may comprise an application installed on the user device or a browser-based service) to access information about the tracking tag, including its current and, possibly, its past locations.

Pre-association may be established in a set-up operation in which a given user may, for example, pair or link the particular tracking tag with one or more user devices of the given user. Alternatively, or additionally, pre-association may be by means of pairing or linking the particular tracking tag with a user identifier or user account such that any user device running an application also linked to the same user identifier or user account can access information about the tracking tag.

User devices can detect the presence of proximate tracking tags via short-range communications, e.g. via Bluetooth or some other short-range wireless communications link, even if they are not pre-associated with a particular tracking tag. They will likely not be able to access information about the tracking tag, or at least not all information available to user devices that are pre-associated with the tracking tag, but they at least may be able to know that a tracking tag is nearby. In such cases, the tracking tag may be termed as "foreign" to the user device. If a foreign tracking tag is also not proximate a user device with which it is pre-associated, or indeed any other user device, then it may be considered unaccompanied.

Considering that short-range communication technologies such as Bluetooth and UWB may have ranges of up to one hundred metres, it is possible that a user device may detect a plurality of foreign tracking tags in situations where lots of people are nearby, such as in a crowded shopping centre or on a public transportation system.

There may be privacy and security concerns, as it may not be apparent if one or more of such foreign tracking tags are being used for malicious purposes, such as to determine the whereabouts of someone without their knowledge. For example, a malicious actor may place a tracking tag with which they are pre-associated into another person's clothing or bag in order to remotely determine that other person's home or work location at a later time.

Example embodiments may be directed to distinguishing potentially suspicious tracking tags from other tracking tags that happen to be in proximity of a given user. A balance may be achieved between alerting a user too much, which may lead to them becoming overly paranoid about the presence of foreign tracking tags and/or disabling their tracking tag application, whilst nevertheless alerting them to suspicious tacking tags to maintain confidence in the system.

Figures 1A, 1B, 1C:
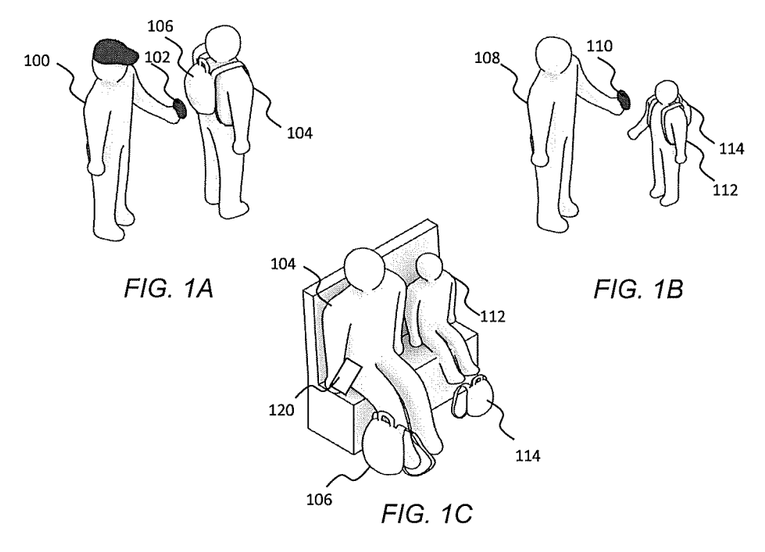
FIGS. 1A-1C are a representational views of sequences of events in which example embodiments may find useful application.

FIGS. 1A-1C are a representational views of a sequence of events in which example embodiments may find useful application.

FIG. 1A shows a first person 100 placing a first tracking tag 102 with which they are pre-associated into an item carried by a second person 104, namely into their rucksack 1o6. The second person 104 may not be aware of this placement.

FIG. 1B shows a third person 1o8 placing a second tracking tag no with which they are pre-associated into an item carried by a fourth person 112, namely into their rucksack 114. The third person 108 may be a parent of the fourth person 112 and the placement may be made with the fourth person's knowledge for safety or security purposes, e.g. so that the parent can know where their child is at a given time.

In the case of FIG. 1A, the first person 100 may be a malicious actor intent on tracking the movements of the second person 104. For example, the first person 100 may wish to know the location of the second person's home or workplace because the second person 104 appears vulnerable.

FIG. 1C shows the second person 104 and the fourth person 112 at a subsequent time when sat close to one another on a public transportation vehicle, such as a train. On the assumption that the second person 104 has a tracking application running on a user device, e.g. on their smartphone 120, that application may detect two foreign tracking tags in proximity, namely the first tracking tag 102 and the second tracking tag 110. However, the second person 104 cannot at this time distinguish between the first and second tracking tags 102, 110 nor appreciate that the first tracking tag has been placed in their rucksack 1o6 for malevolent purposes. Where more people are in proximity on the train, one or more additional tracking tags may be detected and indicated to the user device.

It would be useful for the second person 104 to know about the presence of the first tracking tag 102 at some point in time.

Figure 2:
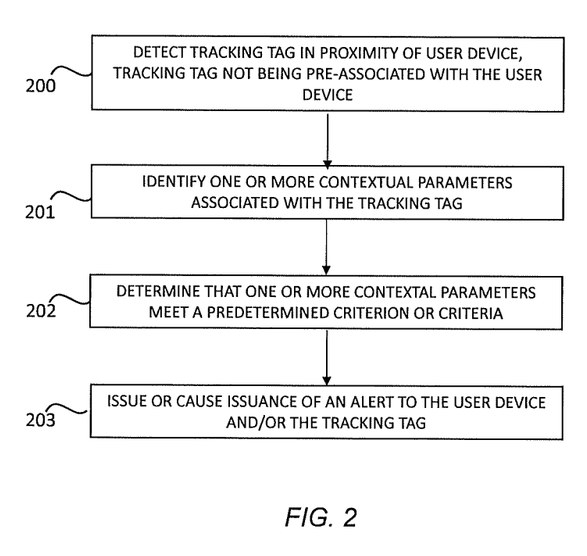
FIGS. 2 and 3 are flow diagrams indicating processing operations in accordance with example embodiments.

FIG. 2 is a flow diagram indicating processing operations that may be performed, for example, by a user device such as the smartphone 120 shown in FIG. 1C, although it is possible that said operations might be performed using an external system. For example, said operations, and any operations to be described below, may also be performed at a remote server in the cloud, such as at a cloud-based tracking platform (hereafter "tracking platform") to which the first and second tracking tags 102, 110 may be pre-associated.

The processing operations may be performed by hardware, software, firmware or a combination thereof.

A first operation 200 may comprise detecting a tracking tag in proximity of a user device, the tracking tag not being pre-associated with the user device. In other words, the tracking tag may be foreign to the user device.

A second operation 201 and a third operation 202 may be performed responsive to the detection, and said operations may be performed while the tracking tag remains in proximity of the user device. In this regard, the tracking tag may remain in proximity for a continuous period of time, or may temporarily go out-of-range for a short, predetermined period of time, e.g. no more than thirty seconds, and then return in-range.

The second operation 201 may comprise identifying one or more contextual parameters associated with the tracking tag. Identifying may comprise measuring or receiving the parameters in data form, possibly from one or more sensors and/or from other devices.

The third operation 202 may comprise determining that the identified one or more contextual parameters meet a predetermined criterion or criteria.

A fourth operation 203 may comprise issuing or causing issuance of an alert to the user device and/or to the tracking tag based on the determination of the third operation 202.

Thus, based on a determined context, as represented by the identified one or more contextual parameters, it may be possible to distinguish between suspicious or malevolent situations and those less likely to be of concern. Thus, a user may not be alerted in all situations thereby avoiding overlying alerting them and also saving on processing and bandwidth resources.

The one or more contextual parameters may be measured using one or more sensors or other receiving means of the user device. A contextual parameter may comprise any parameter indicative of a current or past situation associated with the tracking tag, which may be an indirect association such as one measured or received by one or more proximate user devices.

In some embodiments, the first operation 200 may also involve detection of a tracking tag that is not only foreign, but also unaccompanied. That is, the tracking tag is not in proximity of another user device with which it is pre-associated. This avoids monitoring the context of all foreign tracking tags and focusses only on those that are arguably more likely to be malevolently placed, because the owner is not proximate their own tracking tag.

Whether or not a detected tag is unaccompanied may be based on information provided by, for example, a tracking platform that is able to generate and maintain a global status of multiple tracking tags with which it is associated. If the pre-associated user or user device is not currently proximate one of their own tracking tags, then the tracking tag is unaccompanied and its status may be set as such. For example, referring to FIG. 1C, the first tracking tag 102 is unaccompanied because the first person 100 is not proximate to it. Upon detection of the first tracking tag 102 by the smartphone 120 of the second person 104, an identity of the first tracking tag (e.g. #12345) may be transmitted by the smartphone to the tracking platform which can determine that said first tracking tag is currently unaccompanied. That unaccompanied status may be transmitted back to the smartphone 120 for performance of subsequent operations of the FIG. 2 process, or those operations may be performed at the tracking platform and the fourth, alert operation 203 may cause issuance of an alert at the smartphone 120 (and/or at the first tracking tag 102) by means of transmitting an alert message to the smartphone or the first tracking tag.

Various examples of identified one or more contextual parameters and the predetermined criterion or criteria will now be described.

For example, the smartphone 120 (or tracking platform) may estimate a geolocation of the first tracking tag 102 over a period of time, which may indicate a location-based context. The geolocation of the tag itself may be tracked or, in some embodiments, the closeness of a tag to a user device whose geolocation is being tracked may be tracked. If that geolocation context meets the predetermined criterion or criteria, then an alert may be issued, or is caused to be issued, at the smartphone 120 and/or the first tracking tag 102. The geolocation may be determined using any of the above-mentioned methods, e.g. by use of a GNSS or other multilateration techniques.

For example, if the geolocation of the first tracking tag 102 is a predetermined geographic location, or within a predetermined range of the predetermined geographic location, an alert may be issued or caused to be issued at the smartphone 120. For example, the predetermined geographic location may correspond to the home or workplace of the second person 104 or indeed any location considered sensitive.

The predetermined geographic location may be set-up during an initialisation stage of a tracking application on a user device, such as on the smartphone 120. For example, a user such as the second person 104 may input a current location as the predetermined geographic location when they are at home or at work. Additionally, or alternatively, a user may enter an address, a postcode or a zip code, or use a map user interface to drop a marker or pin at what is to be the predetermined geographic location. A user may set-up a plurality of predetermined geographic locations with respective identifiers, each of which can be enabled and disabled via the tracking application installed on the user device, such as the smartphone 120. A user may also control a predetermined range around the one or more geographic locations that will be considered a correspondence, e.g. within five metres. This may help control sensitivity for alerts. The predetermined geographic location may be saved at the user device, such as at the smartphone 120 and/or may be uploaded or synchronised to the tracking platform where it is associated with the user device and/or the user identifier of the second person 104.

In some cases, the predetermined geographic location may be inferred automatically, e.g. based on it being a location at which the user device, such as the smartphone 120, remains substantially static overnight and/or over a period of a predetermined number of days. It may be inferred in such situations that the geographic location of the user device corresponds to the user's home.

For example, a user, such as the second person 104, may additionally, or alternatively, set-up a predetermined geographic area, such as by use of a map application which may comprise part of the tracking application on the user device, such as the smartphone 120. In this case, if the geolocation of the first tracking tag 102 enters anywhere within the predetermined geographic area, an alert may be issued or caused to be issued at the smartphone 120.

For example, a user, such as the second person 104, may additionally, or alternatively, set-up one or more predetermined geo-fences, such as by use of a map application which may comprise part of the tracking application on the user device, such as the smartphone 120. In this case, if the geolocation of the first tracking tag 102 crosses the one or more geo-fences, an alert may be issued or caused to be issued at the smartphone 120. For example, the second person 104 may set-up a geo-fence that spans a driveway to their home.

Figure 3:
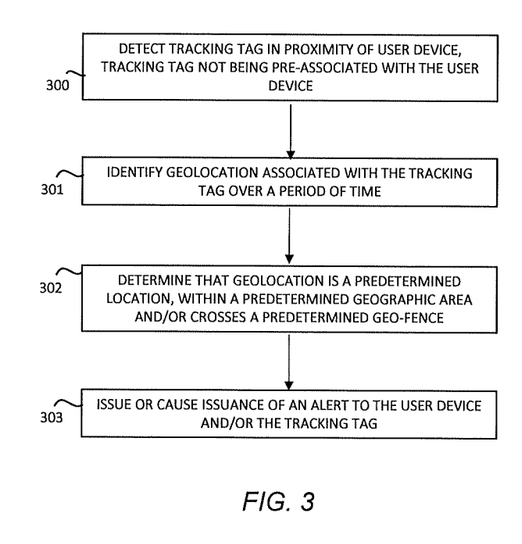

FIG. 3 is a flow diagram indicating processing operations that may be performed based on the above example, for example, by a user device such as the smartphone 120 shown in FIG. 1C, although it is possible that said operations might be performed using an external system such as a tracking platform.

A first operation 300 may comprise detecting a tracking tag in proximity of a user device, the tracking tag not being pre-associated with the user device. In other words, the tracking tag may be foreign to the user device and/or unaccompanied.

A second operation 301 may comprise identifying a geolocation associated with the tracking tag over a period of time.

A third operation 302 may comprise determining that the identified geolocation is a predetermined location, within a predetermined geographic area and/or crosses a predetermined geo-fence.

A fourth operation 303 may comprise issuing or causing issuance of an alert to the user device and/or to the tracking tag based on the determination of the third operation 302.

In some example embodiments, the predetermined criterion or criteria may be based on determining a predetermined type, or level of change, in the identified one or more contextual parameters.

For example, one or more sensors of a user device, such as one or more sensors of the smartphone 120, may receive information for enabling the smartphone or the tracking platform to estimate a transportation mode associated with the tracking tag, which may used as an indication of current context.

For example, estimating that a particular type of transportation mode is currently being used may be sufficient to issue or cause issuance of an alert. For example, estimating that a user, such as the second person 104, is walking or is in a taxi, may be sufficient to issue or cause issuance of an alert. Such transportation types are more commonly associated with lone travel as opposed to mass transit involving many passengers.

For example, estimating a change in transportation mode from a first transportation mode to a second transportation mode may be sufficient to issue or cause issuance of an alert. For example, the first transportation mode may be associated with a greater number of travellers than the second transportation mode. For example, the first transportation mode may be associated with a public transportation mode (e.g. train, bus or ferry travel) and the second transportation mode may be associated with a private or lone transportation mode such as walking or a taking a taxi.

In terms of estimating a transportation mode using one or more sensors of a user device, such as one or more sensors of the smartphone 120, this may comprise performing one or more (i.e. a combination) of:

(i) measuring an estimated geolocation of the user device or the tracking tag, e.g. by means of one of the above-mentioned positioning techniques;

(ii) measuring one or more estimated movement characteristics of the user device or the tracking tag;

(iii) use of a communicative application on the user device associated with a carrier associated with a particular form of transportation mode; and (iv) a payment or booking made communicatively using the user device for travel with a carrier associated with a particular form of transportation mode.

For example, in respect of item (i), an estimated geolocation which corresponds with a train line or a bus route may be indicative of a rail or bus transportation mode.

For example, in respect of item (ii), an estimated first velocity of movement may be associated with train travel, an estimated (slower) second velocity of movement may be associated with bus travel and an estimated (even slower) third velocity of movement may be associated with walking. Average velocities of movement may be used.

Velocity may be determined based on change in geographic location over time and/or by one or more inertial sensors that may comprise part of the user device, such as the smartphone 120. Indeed, one or more inertial sensors may indicate walking as the transportation mode based on a detected gait or detected impacts, as opposed to, or in addition to, velocity.

For example, in respect of item (iii), use of a train, bus or taxi application may be indicative of a current or imminent use of a particular transportation mode.

For example, in respect of item (iv), use of a payment application or near-field payment functionality of the user device, such as the smartphone 120, may be indicative of a current or imminent use of a particular transportation mode.

Figure 4:
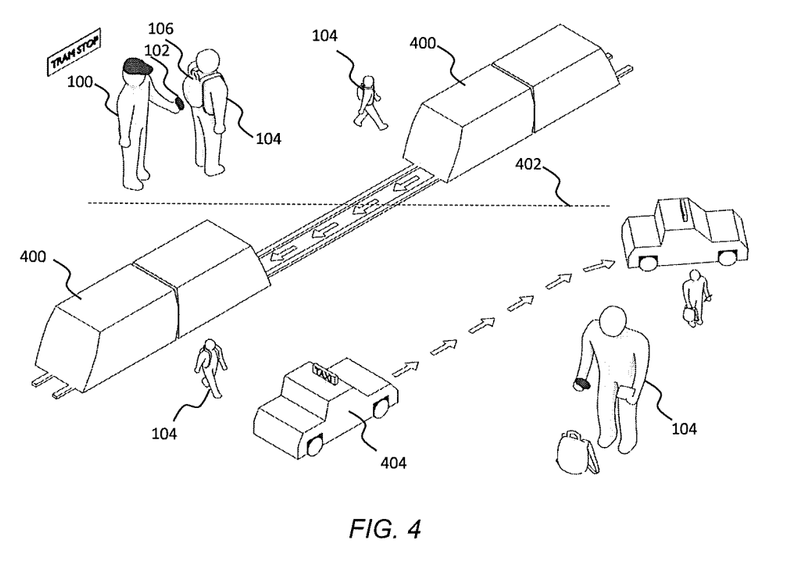
FIG. 4 is a representational view of a sequences of events in which example embodiments may find useful application.

Referring to FIG. 4, for example, which follows-on from FIG. 1A, it is seen that the second person 104 enters a train carriage 400. One of the above methods may be used to determine that the current or imminent context is the second person 104 travelling by train. At a subsequent time, delimited by the dashed line 402, the second person 104 leaves the train carriage 400 and gets into a taxi 404. This change in context may be determined using one of the above methods also, and may or may not be sufficient to issue or cause issuance of an alert. At a subsequent time, the user may leave the taxi 404, at or close-to their home or workplace, and may already be aware of the suspicious tracking tag if an alert is issued so that appropriate action can be taken.

Figure 5:
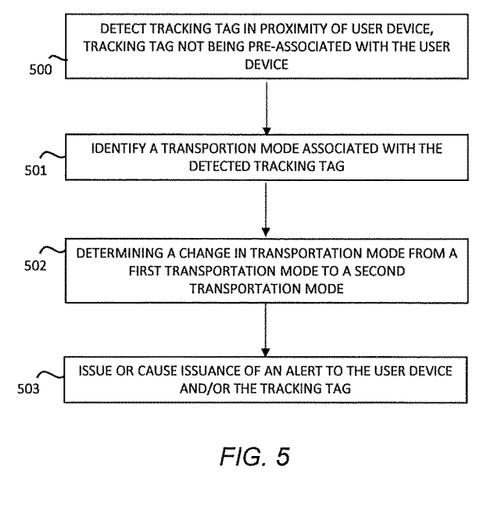
FIGS. 5 and 6 are flow diagrams indicating processing operations in accordance with example embodiments.

FIG. 5 is a flow diagram indicating processing operations that may be performed based on the above example, for example, by a user device such as the smartphone 120 shown in FIG. 1C, although it is possible that said operations might be performed using an external system such as a tracking platform.

A first operation 500 may comprise detecting a tracking tag in proximity of a user device, the tracking tag not being pre-associated with the user device. In other words, the tracking tag may be foreign to the user device and/or unaccompanied.

A second operation 501 may comprise identifying a transportation mode associated with the tracking tag over a period of time.

A third operation 502 may comprise determining a change from a first transportation mode to a second transportation mode.

A fourth operation 503 may comprise issuing or causing issuance of an alert to the user device and/or to the tracking tag based on the determination of the third operation 502.

In some example embodiments, the predetermined criterion or criteria may be based on determining that the tracking tag is in proximity of the user device, such as the smartphone 120, for greater than a predetermined period of time. In this regard, the time period for which the tracking tag is in proximity of the user device is considered a contextual parameter. For example, if the first tracking tag 102 shown in FIG. 1A is in proximity of the user device for greater than, say, one hour, then this may be sufficient to issue or cause issuance of an alert.

In some example embodiments, the predetermined criterion or criteria may be based on the number of other user devices (e.g. other smartphones) and/or other tracking tags in proximity of the user device. For example, if there are fewer than, say, two or even one other user device or tracking tag in short-range communications range of the user device, such as the smartphone 120, then this may be sufficient to issue or cause issuance of an alert.

The number of other user devices and/or other tracking tags may be user-defined via the tracking application. This may help control sensitivity for alerts.

Figure 6:
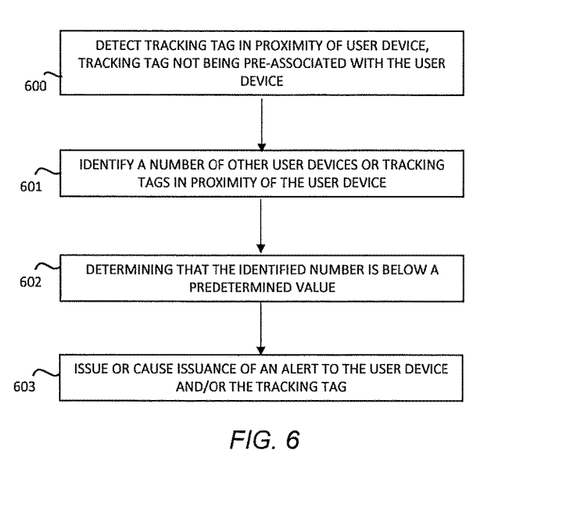

FIG. 6 is a flow diagram indicating processing operations that may be performed based on the above example, for example, by a user device such as the smartphone 120 shown in FIG. 1C, although it is possible that said operations might be performed using an external system.

A first operation 600 may comprise detecting a tracking tag in proximity of a user device, the tracking tag not being pre-associated with the user device. In other words, the tracking tag may be foreign to the user device and/or unaccompanied.

A second operation 603 may comprise identifying a number of other user devices or tracking tags in proximity of the user device.

A third operation 602 may comprise determining that the identified number is below a predetermined number.

A fourth operation 603 may comprise issuing or causing issuance of an alert to the user device and/or to the tracking tag based on the determination of the third operation 602.

In any of the above examples for determining whether one or more contextual parameters meet one or more predetermined criteria, combinations of different predetermined criteria may be set or user-defined. For example, a user such as the second person 104 may pre-define that a change from a train or bus mode of transportation to a taxi or walking mode of transportation, combined with there being no other user devices in close-range proximity of the smartphone 120, and combined with the foreign or unaccompanied tracking tag being detected in close-range proximity of the smartphone for more than ten minutes, is appropriate to cause an alert. This may be in addition to one or more other predetermined criteria, such as the use of predetermined geographic locations, areas and/or geo-fences.

In some example embodiments, issuing or causing issuance of the alert may comprise outputting a visual alert to a user interface of the user device, such as a graphical user interface of the smartphone 120. Additionally, or alternatively, an audio and/or haptic alert may be issued. Responsive to receiving a user selection associated with the visual alert, this may cause the foreign and/or unaccompanied tracking tag to sound an audio alert, to vibrate and/or to indicate on the user interface an estimated direction of the tracking tag. This may assist the user to locate the foreign and/or unaccompanied tracking tag after which they may dispose of it, place it into a shielding pouch and/or report it via telephone or the tracking application to the tracking platform administrator and/or the police. In some circumstances, the user may at least temporarily disable the foreign and/or unaccompanied tracking tag's operation by reporting it to the tracking platform.

Figure 7:
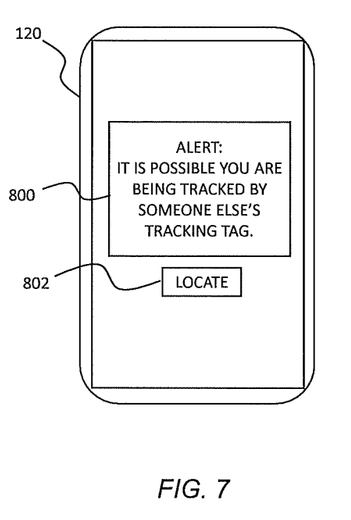
FIG. 7 shows a smartphone as an example of a user device in accordance with an example embodiment.
Figure 8:
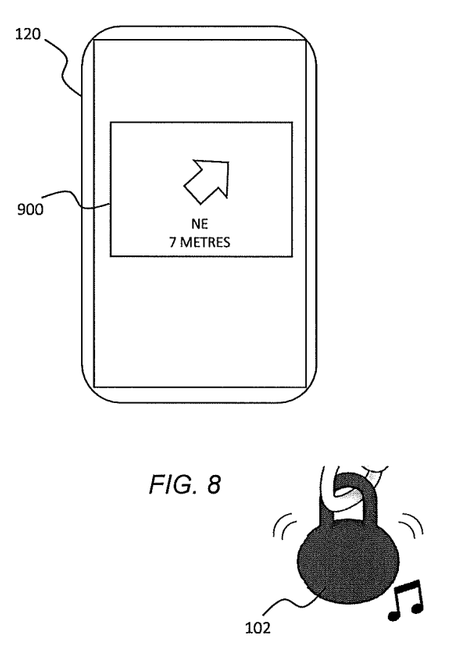
FIG. 8 shows a user interface element in accordance with an example embodiment.

FIG. 7, for example, shows the smartphone 120 of FIG. 1C as an example of a user device. The smartphone 120 displays a user interface element 800 which may visually alert the user, i.e. the second person 104, based on any of the above criteria. A further, optional user interface element 802, which is an interactive user interface element, enables the user via selection to open a new window shown in FIG. 8. Referring to FIG. 8, the new window displays another user interface element goo giving a directional vector and approximate distance to enable the second person 104 to locate the first tracking tag 102. Additionally, or alternatively, a map view could be presented. Additionally, or alternatively, a signal may be issued to the first tracking tag 102 to cause it to sound an alert and/or to vibrate to aid locating.

Figure 9:
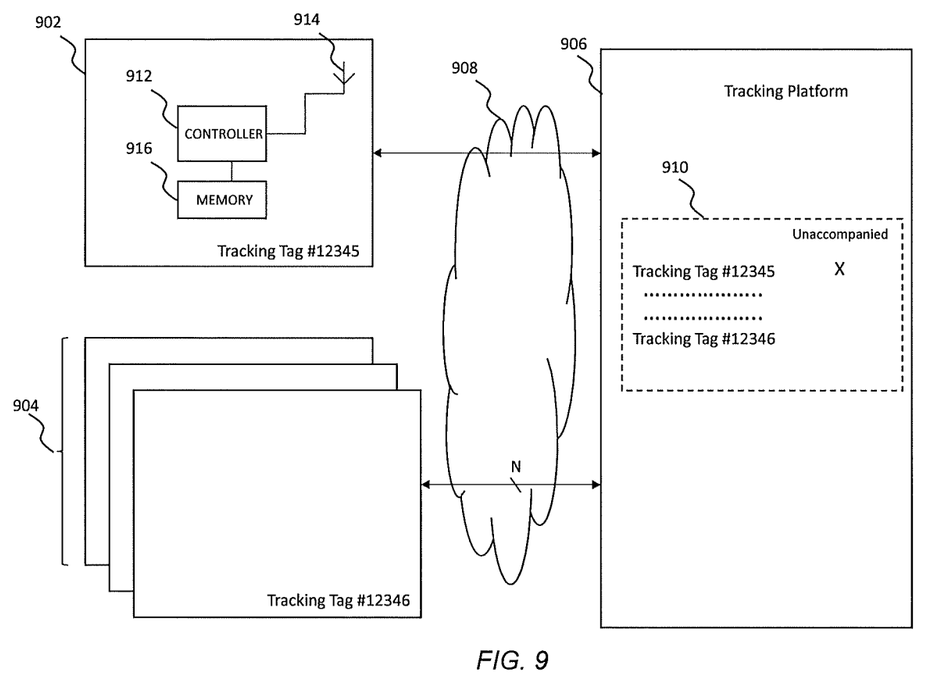
FIG. 9 indicates schematically a plurality of tracking tags and a tracking platform in accordance with an example embodiment.

FIG. 9 is shown for completeness, and indicates schematically a plurality of tracking tags, including a first tracking tag 902, a plurality of second tracking tags 904 and a tracking platform 906.

The first tracking tag 902 and the plurality of second tracking tags 904 are pre-associated with the tracking platform 906 and, via communications over a network 908, e.g. the internet, a geolocation and status of each of the tracking tags can be maintained.

The first tracking tag 902 may comprise a controller 912, e.g. one or more processors, one or more antennas 914 and one or more memories 916. The one or more memories 916 may store, inter alia, a unique identifier (e.g. #12345) which is known to the tracking platform 906 for correlating the first tracking tag 902 with one or more pre-associated user devices and/or user identifiers.

For example, the tracking platform 906 may determine that the first tracking tag 902 is unaccompanied because no user device pre-associated with said first tracking tag is in short-range proximity of it. As such, a status module 910 of the tracking platform 906 may update the status of the first tracking tag 902 to be unaccompanied. Thus, if another user device which is not pre-associated with the first tracking tag 902 detects it within short-range proximity, the tracking platform 906 may determine, or indicate to the other user device, the unaccompanied status. This facilitates subsequent operations by the other user device or by the tracking platform 906 of alerting based on contextual parameters.

Example Apparatus

Figure 10:
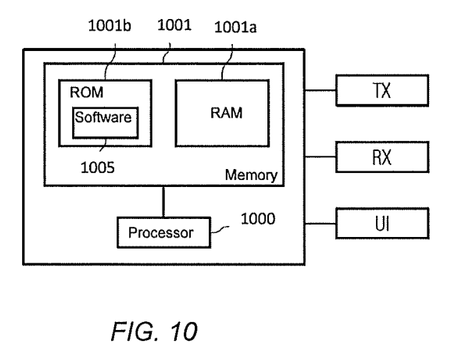
FIG. 10 shows an apparatus according to some example embodiments.

FIG. 10 shows an apparatus according to some example embodiments, which may comprise any of a user device, such as the smartphone 120, or the tracking platform 906, or part thereof. The apparatus may be configured to perform the operations described herein, for example operations described with reference to any disclosed process. The apparatus comprises at least one processor 1000 and at least one memory 1001 directly or closely connected to the processor. The memory 1001 includes at least one random access memory (RAM) 1001*a* and at least one read-only memory (ROM) 1001*b*. Computer program code (software) 1005 is stored in the ROM 1001*b*. The apparatus may be connected to a transmitter (TX) and a receiver (RX). The apparatus may, optionally, be connected with a user interface (UI) for instructing the apparatus and/or for outputting data. The at least one processor 1000, with the at least one memory 1001 and the computer program code 1005 are arranged to cause the apparatus to at least perform at least the method according to any preceding process, for example as disclosed in relation to the flow diagrams herein and related features thereof.

Figure 11:
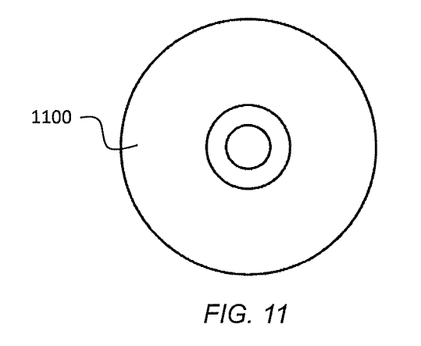
FIG. 11 shows a non-transitory media according to some embodiments.

FIG. 11 shows a non-transitory media 1100 according to some embodiments. The non-transitory media 1100 is a computer readable storage medium. It may be e.g. a CD, a DVD, a USB stick, a blue ray disk, etc. The non-transitory media 1100 stores computer program code, causing an apparatus to perform the method of any preceding process for example as disclosed in relation to the flow diagrams herein and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory module may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus, comprising:
   at least one processor; and
   at least one non-transitory memory including computer program code,
   the at least one memory and the computer program code configured to, with the at least one processor, cause the apparatus to perform:
      detecting a tracking tag in proximity of a user device, the tracking tag not being pre-associated with the user device;
      responsive to the detection, and while the tracking tag remains in proximity of the user device:
         identifying one or more contextual parameters associated with the tracking tag;
         responsive to determining that the identified one or more contextual parameters meet a predetermined criterion or criteria, estimating a transportation mode associated with the tracking tag over a period of time;
         responsive to determining a predetermined type or level of change in the identified one or more contextual parameters, and responsive to determining a change in the transportation mode from a first transportation mode to a second transportation mode, issuing or causing issuance of an alert to at least one of the user device or the tracking tag.

2. The apparatus of claim 1, wherein the at least one memory and the computer program code are configured to, with the at least one processor, cause the apparatus to detect that the tracking tag is not in proximity of another user device with which it is pre-associated.

3. The apparatus of claim 1, wherein the at least one memory and the computer program code are configured to, with the at least one processor, cause the apparatus to detect the tracking tag with a short-range wireless communication link.

4. The apparatus of claim 1, wherein the at least one memory and the computer program code are configured to, with the at least one processor, cause the apparatus to estimate a geolocation of the tracking tag over a period of time and the alert is based on the estimated geolocation meeting the predetermined criterion or criteria.

5. The apparatus of claim 4, wherein the at least one memory and the computer program code are configured to, with the at least one processor, cause the apparatus to perform the issuing or causing issuance of the alert responsive to the estimated geolocation being one or more of a predetermined geographic location, within a predetermined geographic area and crossing a predetermined geo-fence.

6. The apparatus of claim 5, wherein the predetermined geographic location, geographic area and geo-fence corresponds with a user's home and/or workplace.

7. The apparatus of claim 1, wherein the first transportation mode is associated with a greater number of travellers than the second transportation mode.

8. The apparatus of claim 7, wherein the first transportation mode is associated with a public transportation mode and the second transportation mode is associated with a private or lone transportation mode.

9. The apparatus of claim 1, wherein the at least one memory and the computer program code are configured to, with the at least one processor, cause the apparatus to estimate the transportation mode with one or more of:

measuring an estimated geolocation of the user device or the tracking tag;

measuring one or more estimated movement characteristics of the user device or the tracking tag;

use of an application on the user device associated with a carrier associated with a particular form of transportation mode; or a payment or booking made using the user device for travel with a carrier associated with a particular form of transportation mode.

10. The apparatus according to claim 1, wherein the at least one memory and the computer program code are configured to, with the at least one processor, cause the apparatus to perform the issuing or causing issuance of the alert responsive to the tracking tag being in proximity of the user device for greater than a predetermined period of time.

11. The apparatus according to claim 1, wherein the at least one memory and the computer program code are configured to, with the at least one processor, cause the apparatus to identify a number of other user devices or tracking tags in proximity of the user device and perform the issuing or causing issuance of the alert responsive to the identified number being below a predetermined value.

12. The apparatus according to claim 1, wherein the at least one memory and the computer program code are configured to, with the at least one processor, cause the apparatus to output a user alert and, responsive to receiving a user selection associated with the user alert, to cause the tracking tag to sound an audio alert, to vibrate and/or to indicate on the user interface an estimated direction of the tracking tag.

13. A method, comprising:

detecting a tracking tag in proximity of a user device, the tracking tag not being pre-associated with the user device;

responsive to the detection, and while the tracking tag remains in proximity of the user device:

identifying one or more contextual parameters associated with the tracking tag;

responsive to determining that the identified one or more contextual parameters meet a predetermined criterion or criteria, estimating a transportation mode associated with the tracking tag over a period of time;

responsive to determining a predetermined type or level of change in the identified one or more contextual parameters, and responsive to determining a change in the transportation mode from a first transportation mode to a second transportation mode, issuing or causing issuance of an alert to at least one of the user device or the tracking tag.

14. A non-transitory program storage device readable by an apparatus, tangibly embodying a program of instructions executable by the apparatus for performing operations, the operations comprising:

detecting a tracking tag in proximity of a user device, the tracking tag not being pre-associated with the user device;

responsive to the detection, and while the tracking tag remains in proximity of the user device:

identifying one or more contextual parameters associated with the tracking tag;

responsive to determining that the identified one or more contextual parameters meet a predetermined criterion or criteria, estimating a transportation mode associated with the tracking tag over a period of time;

responsive to determining a predetermined type or level of change in the identified one or more contextual parameters, and responsive to determining a change in the transportation mode from a first transportation mode to a second transportation mode, issuing or causing issuance of an alert to at least one of the user device or the tracking tag.

* * * * *